US010822674B1

(12) United States Patent
Kawarizadeh (10) Patent No.: US 10,822,674 B1
(45) Date of Patent: Nov. 3, 2020

(54) SYSTEM AND METHOD FOR RECOVERING BASE AND PRECIOUS METALS

(71) Applicant: Behrouz Kawarizadeh, New Albany, OH (US)

(72) Inventor: Behrouz Kawarizadeh, New Albany, OH (US)

( * ) Notice: Subject to any disclaimer, the term of this patent is extended or adjusted under 35 U.S.C. 154(b) by 464 days.

(21) Appl. No.: 15/005,086

(22) Filed: Jan. 25, 2016

Related U.S. Application Data

(60) Provisional application No. 62/108,183, filed on Jan. 27, 2015.

(51) Int. Cl.
| | | |
|---|---|---|
| *C22B 3/00* | (2006.01) | |
| *C25C 1/20* | (2006.01) | |
| *C22B 9/02* | (2006.01) | |
| *C22B 7/00* | (2006.01) | |
| *B08B 3/06* | (2006.01) | |
| *B07B 1/24* | (2006.01) | |

(52) U.S. Cl.
CPC .............. *C22B 11/046* (2013.01); *B07B 1/24* (2013.01); *B08B 3/06* (2013.01); *C22B 3/00* (2013.01); *C22B 7/007* (2013.01); *C22B 9/023* (2013.01); *C25C 1/20* (2013.01); *Y02P 10/234* (2015.11)

(58) Field of Classification Search
None
See application file for complete search history.

(56) References Cited

U.S. PATENT DOCUMENTS

| | | | | |
|---|---|---|---|---|
| 2,238,697 | A * | 4/1941 | Hinsky | D06B 3/00 118/125 |
| 4,426,225 | A | 1/1984 | Ida et al. | |
| 4,426,251 | A * | 1/1984 | Ida | C22B 7/007 156/345.15 |
| 5,015,302 | A * | 5/1991 | Henig | B08B 3/06 134/135 |
| 5,295,665 | A * | 3/1994 | Mackie | C22B 1/00 209/461 |
| 6,986,192 | B2 | 1/2006 | Fitch | |
| 7,166,145 | B1 | 1/2007 | Han | |
| 8,057,572 | B2 | 11/2011 | Mauldin | |

(Continued)

*Primary Examiner* — Alexandra M Moore
*Assistant Examiner* — Catherine P Smith
(74) *Attorney, Agent, or Firm* — Ronald J. Koch; The Eley Law Firm (57) ABSTRACT

A system for recovering precious metals includes a rotatable drum, recyclable materials, and a separating solution. The rotatable drum is configured to receive recyclable materials. The recyclable materials include non-metallic materials and electronic components, with one or both of the non-metallic materials and the electronic components having attached thereto one or both of base metals and precious metals. The separating solution is disposed in the rotatable drum and is configured to separate the base metals and the precious metals from the electronic components and the non-metallic materials and to separate the electronic components from the non-metallic materials. The rotatable drum is configured to agitate the recyclable materials and to wash the recyclable materials with the separating solution. The electronic components, non-metallic materials, base metals, and precious metals are each separately removable from the separating solution.

8 Claims, 5 Drawing Sheets

(56) References Cited

U.S. PATENT DOCUMENTS

| | | | |
|---|---|---|---|
| 8,551,212 B1* | 10/2013 | Kawarizadeh | C22B 3/16 |
| | | | 210/353 |
| 9,174,240 B1* | 11/2015 | Wilson | B07B 1/24 |
| 2004/0179985 A1 | 9/2004 | Olper et al. | |
| 2012/0201729 A1* | 8/2012 | Christoffersson | C22B 3/0009 |
| | | | 423/101 |

* cited by examiner

SYSTEM AND METHOD FOR RECOVERING BASE AND PRECIOUS METALS

This application claims priority to U.S. provisional patent application No. 62/108,183, filed Jan. 27, 2015, the entire contents of which are hereby incorporated by reference.

FIELD

The present invention relates generally to a system and method for recovering precious metals, in particular to a system and method for recovering precious metals from scrap electronic equipment.

BACKGROUND

Recycling of used materials is becoming an essential part of modern society. Recycling involves the processing of used materials into new products to reduce waste of potentially useful materials, decrease consumption of fresh raw materials, lower energy usage, reduce air pollution from incineration, and decrease water pollution. Recycling also decreases the need for landfills by reducing the need for waste disposal.

Used consumer electronic devices such as computers, printers, video monitors, radios and televisions, as well as used industrial equipment, is an increasing environmental concern. Due to ongoing technological advancement many electronic devices become obsolete within a short period of time, creating a large surplus of unwanted electronic devices that must be disposed of. In addition to the environmental concerns, there is a significant waste of useful materials in these electronic devices. In particular, many electronic devices contain components such as printed wiring assemblies, connectors and integrated circuits having gold plating. It is desirable to efficiently recover the gold plating from these components.

There remains a need for a simple system for recovering precious metals easily and quickly from recyclable materials, such as scrap circuit boards. There is a need for a system including a perforated drum that can be rotated while the recyclable materials remain generally submerged in the separation solution. A system including automation of the separating process and usage of the perforated rotating drum reduces the time required to separate the metals from the carrier materials. Further, there remains a need for a system including a separation barrier to isolate the motor and controller of the rotation system from the chemical environment of the drum. There is also a need for a system utilizing a separating solution which provides separation of metal deposits as well as separation of electronic components from scrap circuit boards.

SUMMARY

A system and method for recovering gold from scrap electronic components is disclosed according to an embodiment of the present invention. Non-metallic carrier materials having base metals and precious metals disposed thereon (or contained therein) are separated from the scrap. A separating solution is applied to carrier materials, causing the base and precious metals to be separated from non-metallic carrier materials to which they are attached. The base and precious metals are then filtered from the separating solution and removed.

A system for recovering precious metals is disclosed according to an embodiment of the present invention. The system includes a rotatable drum, recyclable materials, and a separating solution. The rotatable drum is configured to receive recyclable materials. The recyclable materials include non-metallic materials and electronic components, with one or both of the non-metallic materials and the electronic components having attached thereto one or both of base metals and precious metals. The separating solution is disposed in the rotatable drum and is configured to separate the base metals and the precious metals from the electronic components and the non-metallic materials and to separate the electronic components from the non-metallic materials. The rotatable drum is configured to agitate the recyclable materials and to wash the recyclable materials with the separating solution. The electronic components, non-metallic materials, base metals, and precious metals are each separately removable from the separating solution.

In one embodiment the disclosed invention includes a method for recovering precious metals. The method includes obtaining recyclable materials, the recyclable materials including non-metallic materials and electronic components, with one or both of the non-metallic materials and the electronic components having attached thereto one or both of base metals and precious metals. The method includes obtaining a rotatable drum configured to receive the recyclable materials and obtaining a separating solution configured to separate the base metals and the precious metals from the electronic components and the non-metallic materials, and to separate the electronic components from the non-metallic materials. The method includes submerging the recyclable materials into the separating solution within the rotatable drum and rotating the rotatable drum on a predetermined schedule. The method further includes treating the recyclable materials for a period of time sufficient to separate the base metals and precious metals from the electronic components, and to separate the electronic components from the non-metallic materials. The electronic components, non-metallic materials, base metals, and precious metals are each separately removable from the separating solution.

In one embodiment the disclosed invention includes a method for recovering precious metals. Recyclable materials are obtained, the recyclable materials including non-metallic materials and electronic components, with one or both of the non-metallic materials and the electronic components having attached thereto one or both of base metals and precious metals. The method includes obtaining a rotatable drum and loading the rotatable drum with the recyclable materials. The method includes submerging the recyclable materials into a separating solution within the rotatable drum, and rotating the rotatable drum on a predetermined schedule. The method includes treating the recyclable materials for a period of time sufficient to separate the base metals and the precious metals from the electronic components and the non-metallic materials, and to separate the electronic components from the non-metallic materials. The method also includes removing the non-metallic materials from the separating solution and, if the non-metallic materials contain at least one of base metals and precious metals, breaking apart the non-metallic materials to expose the base metals and precious metals and submerging them in the separating solution for a period of time, sufficient for the base metals and precious metals to be separated from the non-metallic materials by the separating solution. The method further includes removing the electronic components from the separating solution and, if the electronic components contain at least one of base metals and precious metals, breaking apart the electronic components to expose the base metals and precious metals and submerging them in the separating solution for a period of time, sufficient for the base metals and precious metals to be separated from the electronic components by the separating solution. The non-metallic materials, base metals, and precious metals are each separately removable from the separating solution.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

In the discussion that follows, like reference numerals are used to refer to like structures and elements in the various figures.

Figure 1:
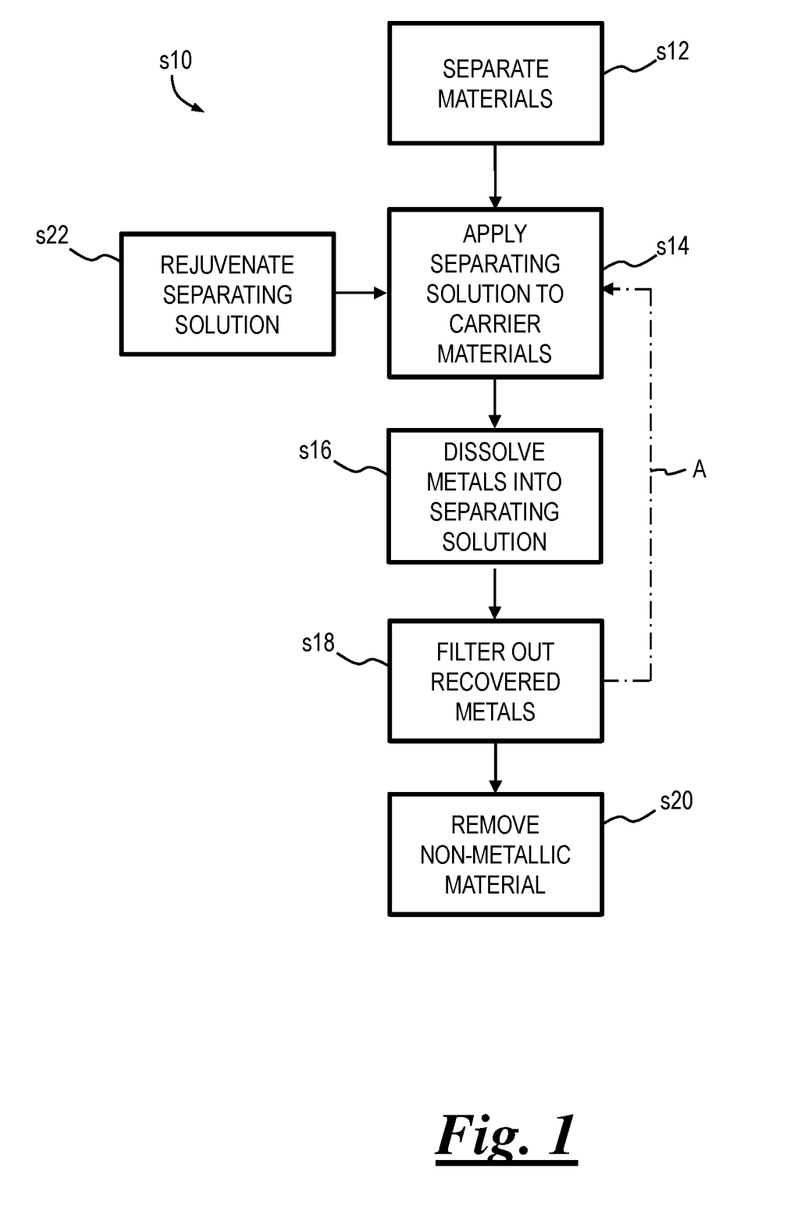
FIG. 1 is a flow diagram of a method for recovering base metals and precious metals according to an embodiment of the present invention.

A flow diagram showing the general arrangement of a method s10 for recovering base metals and precious metals is shown in FIG. 1 according to an embodiment of the present invention, although it will be understood that the order of the steps may be varied to suit a particular application of the method within the scope of the invention.

At s12 recyclable materials are separated in preparation for subsequent processing. It is preferable to separate carrier materials containing precious metals from other materials to the greatest extent possible, but without undue effort. As a non-limiting example of recyclable materials, gold-plated electrical connectors may be removed, broken away or cut away from their mounts or stripped from a non-metallic material (including, but not limited to, plastic and fiberglass) such as a printed wiring board. Likewise, gold-plated portions of printed wiring boards may be cut into small pieces or cut away from portions of the printed wiring boards not containing gold plating. In some instances it may be preferable to grind or crush the carrier materials into small pieces or a powder.

At s14 a separating solution is applied to the carrier materials (including non-metallic materials, base metals and precious metals disposed upon or contained by the non-metallic materials) for a period of time. The separating solution is configured to separate the metals from the non-metallic materials to which they were originally applied. In one embodiment the separating solution is comprised of a mixture of muriatic acid (hydrochloric acid) and hydrogen peroxide. This mixture will dissolve most of the metals, which is a solution of mostly cupric chloride. In another embodiment the separating solution may be made from a mixture of vinegar and hydrogen peroxide. The mixture may be rejuvenated for reuse in further dissolving and separating metals from more carrier materials, such as printed circuit boards.

At s16 the metals, such as gold plating, separate from the carrier materials and are received into the separating solution as the separating solution continues to be applied. The amount of the application time will vary, based upon a number of factors including, but not limited to, the condition of the separating solution, the temperature of the separating solution, the size of the carrier materials and the amount of gold plating.

At s18 the separated gold plating is filtered from the separating solution. In one embodiment the separated gold plating (which may be in the form of small solids or "flakes") is removed from the separating solution by passing the separating solution through a filter material such as a mesh screen or foam padding. The removal may be accomplished periodically, wherein the application ceases and the carrier materials are removed from the application process. The separating solution is filtered, after which the carrier materials are returned to the application step of s16. The method of s14 through s18 is then repeated, as indicated by arrow "A," until substantially all of the gold plating has been separated from the carrier material. Alternatively, steps s16 and s18 may be accomplished by continually circulating the separating solution through a filter to capture separated gold plating. The method of s16 and s18 may likewise be accomplished to separate (i.e., dissolve) base metals from the non-metallic material.

At s20 the non-metallic material left after removal of the gold plating is removed from the separating solution for further processing, which may include recycling and/or disposal.

At s22 the separating solution is rejuvenated to compensate for degradation caused by exposure to the carrier materials. Rejuvenation of cupric chloride, which may be manual and/or automatic, is accomplished by adding predetermined amounts of "fresh" (i.e., relatively pure or uncontaminated) muriatic acid and hydrogen peroxide to the separating solution or replacing the separating solution entirely. If a separating solution of vinegar and peroxide is used, additional quantities of fresh vinegar and peroxide may be added to the separating solution or the separating solution may be replaced entirely. Rejuvenation may be manually controlled by visually monitoring the color of the separating solution and adding the aforementioned materials when the color shifts from a predetermined color, indicating degradation of the separating solution.

Figure 2:
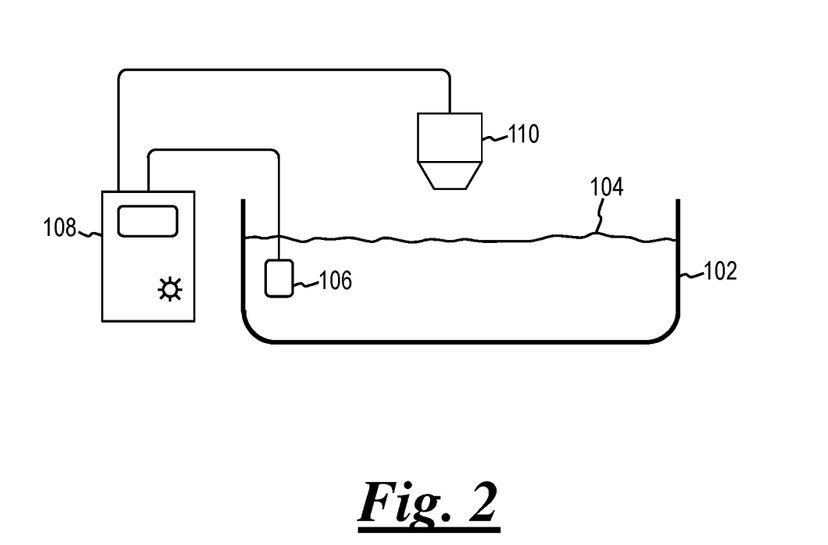
FIG. 2 is a schematic diagram of a system for recovering base metals and precious metals according to an embodiment of the present invention.

An alternate embodiment of the present invention is shown in FIG. 2. A container 102 holds a quantity of a separating solution 104. A transducer 106 is coupled to a monitor 108. Transducer 106 generates an electrical signal corresponding to the color and/or the chemical composition of separating solution 104 and activates a visual or aural alarm when the condition of the separating solution exceeds a predetermined threshold value. Monitor 108 may optionally be coupled to a dispenser 110 to automatically add the rejuvenation materials of s22 (FIG. 1) as needed to maintain the separating solution in a predetermined condition.

The system of FIG. 2 may also be used as a process monitor. In this instance the chemical composition, pH and/or color of the separating solution is periodically or continuously measured by monitor 108, utilizing the electrical signal generated by transducer 106. When the method of s16 is active the chemical composition, pH and/or color of the separating solution is changing due to the reaction between the separating solution and the material being soaked. However, the chemical composition, pH and/or color of the separating solution will become relatively stable at the completion of the soak process. Monitor 108 detects the relatively stable state of the separating solution and activates a visual or aural alarm, indicating the completion of s16.

Figure 3:
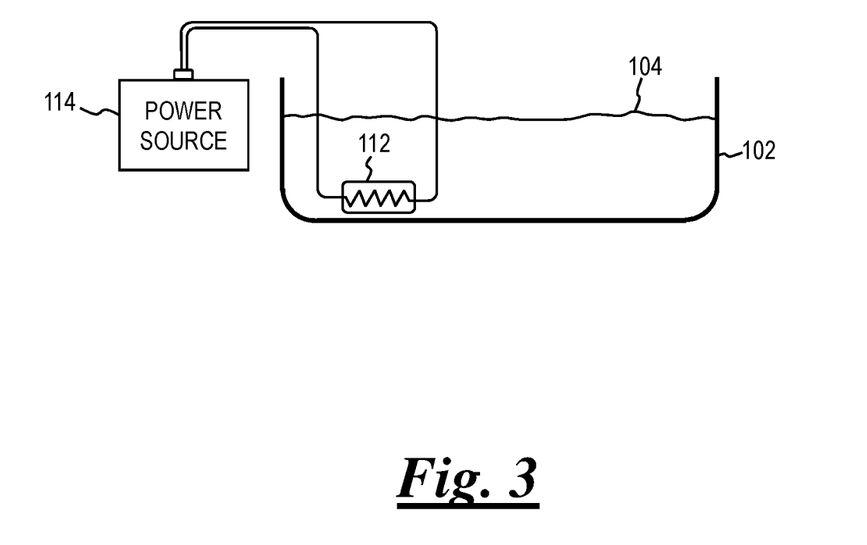
FIG. 3 is a schematic diagram showing a heater used in conjunction with a system for recovering base metals and precious metals according to an embodiment of the present invention.

Another alternate embodiment of the present invention is shown in FIG. 3. A container 102 holds a quantity of a separating solution 104. A heating element 112 is directly in thermal communication with separating solution 104, being submerged in the separating solution 104 and connected to an electrical power source 114. The heating element raises the temperature of the separating solution, thereby accelerating separation of the gold plating from the carrier material and thus reducing the amount of time required for s16. Alternatively, heating element 112 may be placed in indirect thermal communication with separating solution 104, such as by placing the heating element into contact with container 102 and heating the container, which in turn will heat the separating solution.

Figure 4:
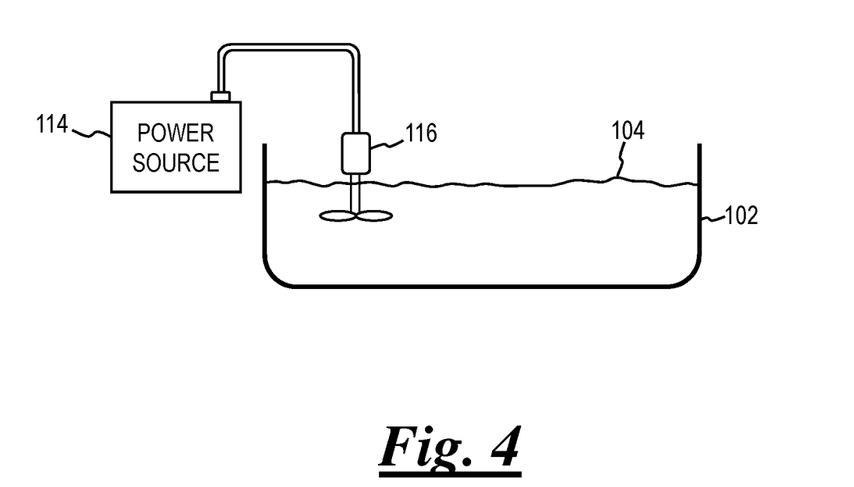
FIG. 4 is a schematic diagram showing an agitator used in conjunction with a system for recovering base metals and precious metals according to an embodiment of the present invention.

Yet another embodiment of the present invention is shown in FIG. 4. A container 102 holds a quantity of a separating solution 104. A fluid agitator 116, which may include or be a fluid pumping device, is submerged in separating solution 104 and connected to an electrical power source 114, causing the separating solution to circulate and thus accelerating separation of the gold plating from the carrier material, thereby reducing the amount of time required for s16.

Figure 5:
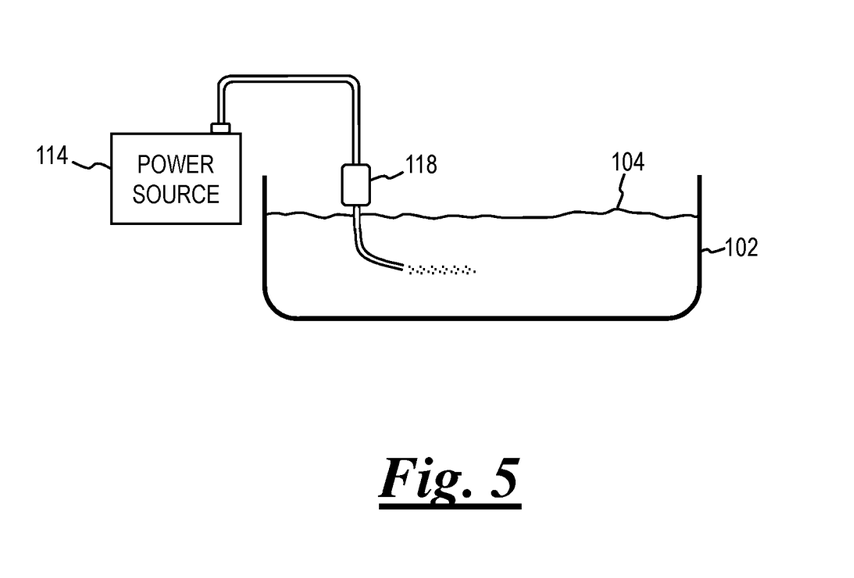
FIG. 5 is a schematic diagram showing an air pump used in conjunction with a system for recovering base metals and precious metals according to an embodiment of the present invention.

Still another embodiment of the present invention is shown in FIG. 5. A container 102 holds a quantity of a separating solution 104. An output of an air pump 118 or other aeration device is submerged in separating solution 104 and connected to an electrical power source 114, causing oxygen to be added to the separating solution and thus accelerating separation of the gold plating from the carrier material, thereby reducing the amount of time required for s16.

In some embodiments the method of FIG. 1 may be used to remove electronic components such as surface-mount devices from printed wiring boards at s16. Once removed at s18, the electronic components may be crushed at s12, and then subjected to the method of s14 through s22 to recover gold plating from the interior of the electronic components. Likewise, printed wiring boards may be crushed to gain access to internal metal layers.

It should be noted that a certain amount of gold plating may be dissolved in the separating solution and thus less susceptible to filter step s18. However, the dissolved gold plating may be recovered using any conventional precipitation reaction, mixing the separating solution with a predetermined second solution to separate a predetermined solid from the mixture. Alternately, any electrochemical process now known or later developed to separate predetermined dissolved solids from the separating solution may be used.

The present invention may be employed to recover metals other than gold particulate. In one embodiment electrolysis, using a select voltage, may be utilized to precipitate desired elements, such as base and precious metals, at s18. Similar processes, such as electrowinning and electrorefining, may also be employed.

Figure 6:
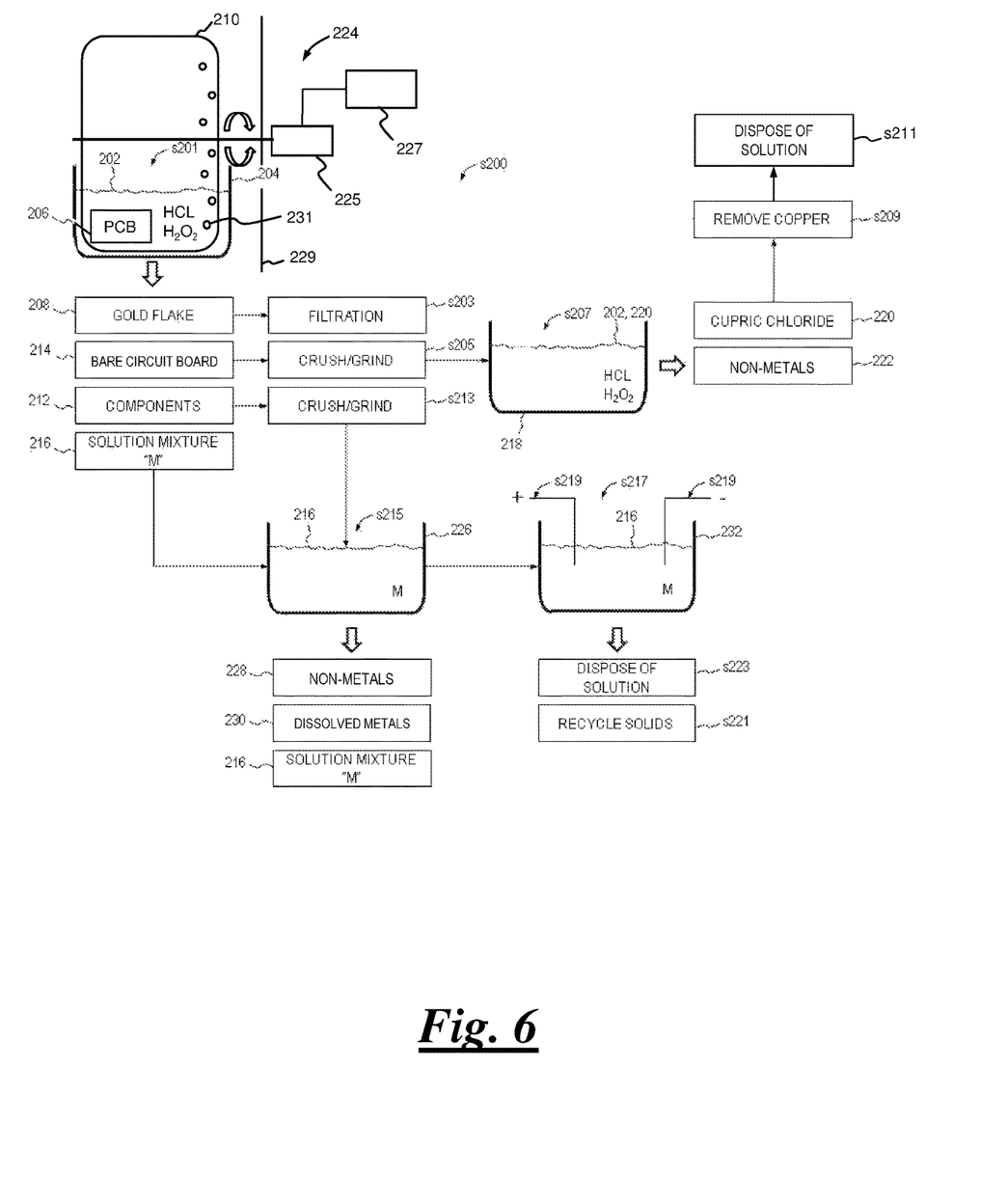
FIG. 6 is a diagram showing a recycling system according to another embodiment of the present invention.

A method S200 for recycling used carrier materials, such as printed circuit board assemblies, is shown in FIG. 6. At step s201 a starting separating solution 202 comprising hydrogen chloride (HCL) and hydrogen peroxide ($H_2O_2$) is placed in a reservoir 204. In one embodiment a perforated receptacle, such as drum 210 receives carrier materials including one or more printed circuit board assemblies (PCBs) 206. At least a portion of drum 210, such as the generally curved cylindrical surface of the drum, includes a plurality of perforations 231. At least a portion of drum 210 is submerged into separating solution 202 inside reservoir 204, the perforations 231 allowing the separating solution 202 to fill a bottom portion of the drum. Drum 210 may be rotated clockwise and/or counterclockwise in order to bathe the carrier materials in the separating solution. A rotation system 224 may be used to automatically rotate drum 210, and may include a motor 225, a control system 227, and a speed reduction/torque amplifier (not shown). Although a motor is shown, rotation system 224 may include any suitable drive means or may be manually rotated by hand. Motor 225 may be powered by any suitable electric power source. The rotation system 224 may optionally include a separation barrier 229 that substantially isolates motor 225 and control system 227 from the chemical environment of drum 210 and reservoir 204.

Control system 227 is configured to provide for automatic operation of the method 200. Control system 227 may include speed and timing controls to control the rotation of drum 210 and to provide various sequences of operation for treatment of the scrap carrier materials. The control system 227 may be configured to include a soak cycle that allows the drum to rest and the carrier materials to be substantially submerged for a predetermined time period in the separating solution 202. In one embodiment the control system 227 may be configured to include an agitation cycle that allows the drum to partially rotate back and forth (e.g. clockwise then counterclockwise) by a predetermined numbers of degrees relative to a longitudinal axis of the drum. The agitation cycle acts to wash the separating solution 202 over the carrier materials as the materials shift within the drum 210. Control system 227 may be configured to further monitor various parameters of and control actions relating to the separating solution. Parameters may include temperature, chemical composition, pH and/or color of the separating solution. Actions may include heating, agitation, aeration, rejuvenation or replacement of the separating solution. Control system 227 may control additional steps or equipment involved in the recovery process.

After the starting separating solution 202 in reservoir 204 has been applied to PCB 206 for a suitable period of time, gold flake 208 will be separated from the PCB. The gold flake 208 may be filtered at step s203 in any conventional manner, including the filtration processes discussed above. In addition, electronic components 212, such as, for example, integrated circuits, will separate from PCB 206, leaving a "bare" circuit board 214 substantially free of electronic components and/or metals. Furthermore, starting separating solution 202 will be transformed to a separating solution mixture "M" 216 comprising dissolved base metals from PCB 206, in particular electronic components 212 and bare circuit board 214. In the event that separating solution 202 becomes inactive during step s201 the separating solution may be "rejuvenated" to increase its efficacy by adding a predetermined amount of HCL and $H_2O_2$ to reservoir 204.

Non-metallic material comprising bare circuit board 214 is broken apart by crushing and grinding into powder at step s205, then at step s207 the powder is immersed in a tank 218 containing a starting separating solution 202. After the powder of bare circuit board 214 have been immersed in tank 218 for a determinable period of time the metals will be dissolved into a primarily cupric chloride solution 220 comprising HCL, $H_2O_2$ and copper from the traces and lands of the bare circuit board. At the completion of step s207 tank 218 will contain non-metallic pieces 222 that may be separated and recycled. The method of steps s205, s207 may be repeated using the cupric chloride solution 220 in tank 218 until the solution becomes saturated. Once cupric chloride solution 220 becomes saturated the dissolved metals (mostly copper) in the solution may be removed at step s209 by any conventional method, such as precipitation. The solution, with much of the metals removed, may be neutralized and disposed of at step s211. The method of step s207 may be rejuvenated to increase its efficacy by adding HCL and $H_2O_2$ to tank 218.

Electronic components 212 may also be ground, as at step s213, then immersed for a determinable period of time at step s215 in a solution M 216 (from step s201) contained by a tank 226. At the completion of step s215 tank 226 will contain non-metallic pieces 228 and dissolved metals 230 that may be separated and recycled, as well as solution M 216.

The solution M 216 in tank 226 may be rejuvenated to increase its efficacy by adding HCL and $H_2O_2$ to the tank. When solution M 216 reaches a saturation point the solution M is transferred to a tank 232. At step s217 dissolved metals in the saturated solution M 216 are separated by any conventional sub-process, such as electrolysis, at step s219, resulting in solids that are recycled at step s221. In one embodiment step s221 includes sending the solids to a refinery for further processing. Finally, the remaining solution M216 is neutralized and disposed of at step s223.

It should be noted that the rotating perforated drum 210 used the hold the carrier material with the method of step s201 may also be used in any or all of the method steps s207, s215, s217. Alternatively and additionally, the separating solution may be sprayed or dispensed onto the carrier material.

Figure 7:
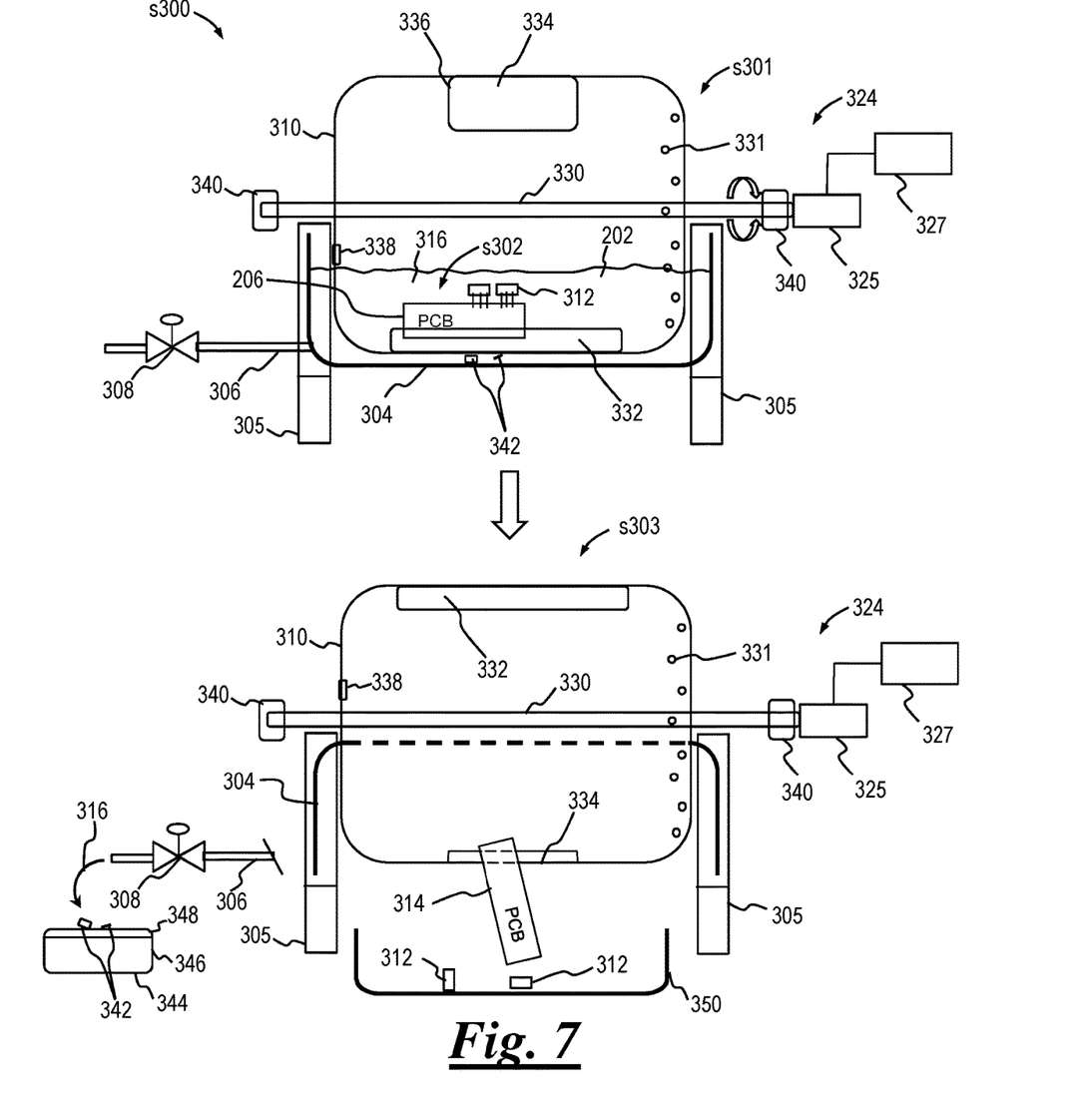
FIG. 7 is a diagram showing an embodiment of an automation method as a sub-part of the recycling system of FIG. 6.

An automated method s300, as a sub-part of method s200 for recycling used carrier materials, such as printed circuit board assemblies, is shown in FIG. 7. At set-up step s301 a reservoir 304 is rotatably mounted to a support 305. Reservoir 304 includes a drain line 306 having a valve 308. Reservoir 304 is filled with a starting separating solution 202 comprising hydrogen chloride (HCL) and hydrogen peroxide ($H_2O_2$). A drum 310 having a plurality of perforations 331 is configured to automatically bathe carrier materials in the separating solution 202 as it rotates via a rotation system 324. Perforations 331 may include circular or oval apertures, or any other suitable shapes such as slots. As a non-limiting example, perforations 331 may be generally circular apertures of about ⅛ inch to ¼ inch in diameter. Drum 310 and reservoir 304 may be made of any suitable material, such as plastic or polymer, which is compatible with the separating solution chemicals.

Rotation system 324 may include a motor 325, control system 327, shaft 330 and a speed reduction/torque amplifier (not shown). Although shaft 330 is shown coupled to drum 310, any suitable coupling member may be used to rotate the drum, such as belts or chains. Drum 310 may include one or more internal vanes 332, an opening 334, a selectably openable or removable door 336 and an inspection port 338. Inspection port 338 may include a removable cap or a viewing window to allow visual access to the interior of drum 310. Shaft 330 is rotatably mounted to a plurality of mounts 340 and is in mechanical communication with motor 325. Mounts 340 may be any suitable assembly configured to support shaft 330 and also allow the shaft to rotate about its longitudinal axis, such as a pillow block with bearings. Drum 310 is mounted to shaft 330 such that a portion of drum 310 is suspended within reservoir 304. Although shaft 330 is shown as a single piece extending through drum 310, shaft 330 may be two pieces connected to opposing end walls of the drum. Rotation of motor 325 is controlled by control system 327, and the control system may include speed and timing controls to control the rotation. Control system 327 may operate to provide a continuous rotation, an on/off duty cycle, single direction rotation, or a back-and-forth rotation of drum 310, or any combination thereof. Speed of rotation may be varied or may be maintained at a low speed as needed to allow for sufficient immersion of the carrier materials in the chemical solution. A non-limiting example of a range of low speeds of rotation is from about 1 to 5 rpm.

At application step s302 one or more of a carrier material, such as printed circuit board assemblies (PCB) 206, is loaded into drum 310 through opening 334 after door 336 is opened or removed. In one embodiment a transportation system (not shown), such as a conveyor, may be used to automatically load drum 310. Once drum 310 is sufficiently loaded, door 336 is closed or re-attached, and control system 327 may operate motor 325 to cause shaft 330 to rotate and slowly spin the drum.

Control system 327 may also include feedback control regarding various sensors sensing temperature or pH of separating solution 202. Control system 327 may be configured to further control monitoring, heating, agitation and aeration of the separating solution, and/or additional steps or equipment involved in the recovery process. During application step s302 at least a portion of drum 310 is kept submerged into separating solution 202 inside reservoir 304 while the drum is rotating. During application at least a portion of one or more PCBs 206 is submerged and soaking in separating solution 202 for a predetermined time. Control system 327 may provide an on/off duty cycle including a soak cycle for a predetermined time, followed by a spin cycle for a predetermined time, followed by a soak cycle, and so on, repeating cycles as required. A non-limiting example of a timed application may include rotating drum 310 for a period of about two minutes every hour.

Vanes 332 serve to agitate separating solution 202 as well as assist in lifting, tumbling and redistributing PCBs 206 to improve the dissolution of metals from the PCBs into the separating solution. As a non-limiting example, vanes 332 may be about 1 inch to 1.5 inches deep, extending away from the inside wall of drum 310, and extending along at least a portion of the length of the drum generally parallel to the longitudinal axis of the drum. In one embodiment, during separation, flakes or metal particulates 342 flow through the perforations in drum 310 and settle into the lower portion of reservoir 304. Inspection port 338 (or door 336) allows for a visual check inside drum 310 of the progress of the process. Control system 327 may provide a final spin cycle for a predetermined time at a predetermined rotational speed in order to further allow remaining metal particulates 342 to separate down into reservoir 304 and to form a separating solution mixture "M" 316. A non-limiting example of a final spin cycle duration is from about 1 to 2 hours. Automation of the separating process and use of the perforated rotating drum acts to reduce the time required to separate the metals from the carrier materials.

After sufficient separation of the metals, the rotation of drum 310 ceases and the metal particulates 342 may be filtered in any conventional manner, including the filtration processes discussed above. In one embodiment, at filtration/removal step s303, valve 308 of drain line 306 is opened to allow separating solution M 316 to flow by gravity from reservoir 304 and discharged from the drain line upon a filter 344 for collection of the metal particulates 342. Filter 344 may be any suitable filter configured for collection of gold flakes or similar metal particulates. Filter 344 may include a container 346 covered with foam padding 348. The discharged separating solution M 316 falls upon foam padding 348 where the metal particulates 342 are captured, and container 346 collects the separating solution below.

Once empty, reservoir 304 may be rotated upwardly in support 305, the rotation being generally parallel to shaft 330, in order to provide clearance below drum 310 for unloading the drum. Drain line 306 may be configured for selectable removal from reservoir 304 or made of sufficient length and/or flexibility to move with reservoir during rotation so as to not interfere with any adjacent structure. Drum 310 is rotated manually or electrically as needed, to position door 336 at a bottom facing unloading position for ease of unloading by gravity. In the unloading position, opening 334 and door 336 may face down toward a fixed or removable holding tray 350 positioned below drum 310. Door 336 is then opened or removed, and the remaining bare PCB boards 314 and components 312 may fall out of or be removed from drum 310 through opening 334 and received by tray 350 below. In one embodiment a transportation system (not shown) such as a conveyor, may be used to automatically move materials away from drum 310. These remaining bare PCB boards 314 and components 312 may be further processed to remove further metals as described above.

It should be noted that the primary chemicals used in the disclosed invention are environmentally friendly. HCL is commonly found as a pool cleaning solution, while $H_2O_2$ is a common chemical used in human hair styling. Oxygen may also be used in addition to or in place of $H_2O_2$ as an oxidizing agent. Furthermore, vinegar may be used as a starting separating solution 202, either by itself or in combination with oxygen and/or $H_2O_2$.

From the above description of the invention, those skilled in the art will perceive improvements, changes, and modifications in the invention. Such improvements, changes, and modifications within the skill of the art are intended to be covered. For example, the embodiments of some or all of FIGS. 2 through 5 may be combined with the methods of FIGS. 1, 6 and 7 within the scope of the invention.

While this invention has been shown and described with respect to detailed embodiments thereof, it will be understood by those skilled in the art that changes in form and detail thereof may be made without departing from the scope of the claims of the invention.

What is claimed is:

1. A system for recovering precious metals, comprising:
a rotatable drum configured to receive recyclable materials, the recyclable materials including non-metallic materials and electronic components, one or both of the non-metallic materials and the electronic components having attached thereto one or both of base metals and precious metals; and
a separating solution disposed in the rotatable drum, the separating solution being configured to separate the base metals and the precious metals from the electronic components and the non-metallic materials, and to separate the electronic components from the non-metallic materials;
a reservoir adapted to receive the separating solution and at least a portion of the rotatable drum, the reservoir further adapted to rotate upwardly relative to the rotatable drum whereby clearance is provided for unloading of the rotatable drum;
the rotatable drum configured to agitate the recyclable materials and to wash the recyclable materials with the separating solution,
the electronic components, non-metallic materials, base metals, and precious metals each being separately removable from the separating solution.

2. The system of claim 1, further comprising a control system configured for providing automatic operation of the system.

3. The system of claim 1 wherein the rotatable drum is perforated.

4. The system of claim 1, further comprising a shaft coupled to the rotatable drum and a motor coupled to the shaft.

5. The system of claim 4, further including a separation barrier configured to isolate the motor from a chemical environment of the rotatable drum.

6. The system of claim 1 wherein the separating solution comprises hydrogen peroxide.

7. The system of claim 1 wherein the separating solution comprises a mixture of muriatic acid and hydrogen peroxide.

8. The system of claim 1 wherein the separating solution comprises a mixture of acetic acid and hydrogen peroxide.

* * * * *